June 13, 1933. N. H. WATTS 1,913,419
CORD TERMINAL MANUFACTURING PROCESS AND APPARATUS
Original Filed March 3, 1928 2 Sheets-Sheet 1

INVENTOR:
Noble H. Watts
BY White, Prost & Fryer
ATTORNEYS.

June 13, 1933. N. H. WATTS 1,913,419
CORD TERMINAL MANUFACTURING PROCESS AND APPARATUS
Original Filed March 3, 1928 2 Sheets-Sheet 2

INVENTOR:
Noble H. Watts
BY White, Prost & Fryer
ATTORNEYS.

Patented June 13, 1933

1,913,419

UNITED STATES PATENT OFFICE

NOBLE H. WATTS, OF ALAMEDA, CALIFORNIA, ASSIGNOR, BY MESNE ASSIGNMENTS, TO GENERAL ELECTRIC COMPANY, OF SCHENECTADY, NEW YORK, A CORPORATION OF NEW YORK

CORD TERMINAL MANUFACTURING PROCESS AND APPARATUS

Application filed March 3, 1928, Serial No. 258,760. Renewed September 10, 1932.

This invention relates generally to processes of and apparatus for the manufacture of cord terminals or connectors of the resilient type.

It is one object of this invention to provide a simple process and apparatus for vulcanizing a resilient rubber body to the end of a rubber sheathed cord.

It is another object of this invention to provide a process for the assembling of the parts of a resilient cord terminal.

It is a further object of this invention to provide an effective process for applying rubber stock to an electric connector assembly, in order to form a body which may be later vulcanized to complete a resilient cord terminal.

Further objects of the invention will appear from the following description in which I have set forth the preferred embodiment of my invention. It is to be understood that the appended claims are to be accorded a range of equivalents consistent with the state of the prior art.

Referring to the drawings.

An article of the type such as I propose to manufacture by the process and apparatus of this invention has been illustrated and claimed in my application No. 163,012, filed January 24, 1927, and entitled Electrical cord terminal. Terminals of this type differ from those of conventional construction in that the body of the terminal is permanently formed about one end of a flexible rubber cord, and the electrical contact members are embedded in resilient rubber so that the rubber, which preferably constitutes the entire body, forms a resilient mounting for the contacts. In my invention I propose to manufacture a resilient terminal as an integral part of a rubber sheathed flexible electric cord, and therefore as one feature of my invention I vulcanize a body of resilient rubber directly to one end of a rubber sheathed electric cord. As will be apparent from the following description, manufacture of a terminal in this manner involves certain problems which I have successfully solved.

Figure 1:
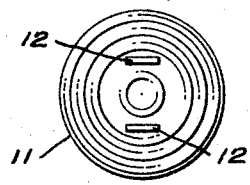
Figures 1 and 2 are end and side elevational views respectively illustrating a completed resilient cord terminal constructed in accordance with the process and with the apparatus of this invention.
Figure 2:
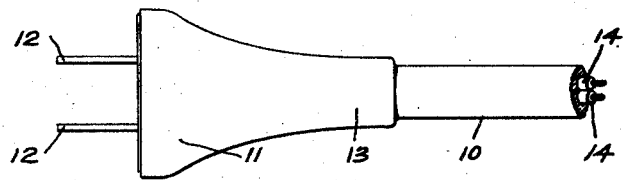

In Figs. 1 and 2 I have shown an article of manufacture such as results from my process. It may be described briefly as comprising a flexible electric cord 10 which preferably has a resilient rubber sheath, and to one end of this cord there is permanently secured an enlarged resilient rubber body 11. Projecting from this body and embedded in the same are the contact members 12, which are adapted to cooperate with a complementary socket or receptacle. The body 11 has a portion 13 of reduced diameter in order to obviate sudden bending of the cord where it enters the body.

Figure 4:
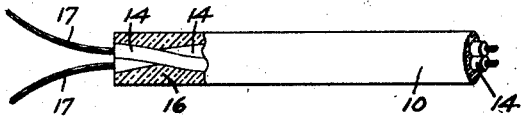
Fig. 4 illustrates in side elevation one end of a rubber sheathed flexible electric cord, prepared for the initial part of the process of this invention.

In Fig. 4 I have illustrated a portion of the flexible electric cord 10 as prepared for the subsequent manufacture of a cord terminal. In order to facilitate describing the process the cord shown has only two electrical conductors 14 which are preferably stranded, the resilient rubber sheath for these conductors being indicated at 16. In practice however I may employ cords having a single or three or more conductors, in which case the terminal is provided with one or more than two contacts. Conductors 14 may or may not have individual insulation, depending upon the type of electric cord utilized. To prepare the cord for connection to the electrical contact members 12, the insulation is stripped back from the end of the cord so as to expose a substantial length of bared conductors 17.

Figure 3:
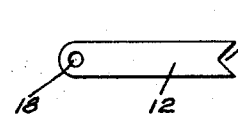
Fig. 3 is a detail illustrating a metal conductor strip suitable for forming the electrical contact members of the resilient terminal.

In Fig. 3 I have illustrated a detail of one of the contact members 12 which I prefer to utilize. This member should be made of metal having good conductivity, and which is capable of being bonded to vulcanized rubber,—as for example common brass. The end of the contact member to be exposed may be provided with the conventional aperture 18, while the end to be embedded is preferably provided with a V-shaped slot 19 for a purpose later to be explained.

Figure 5:
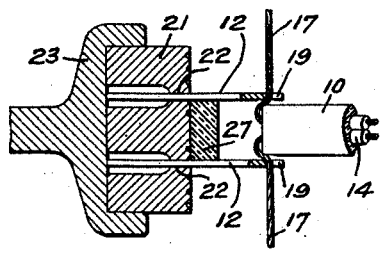
Fig. 5 illustrates one part of the process of manufacture, showing the manner in which the contact strips are applied to the flexible electric cord.
Figure 6:
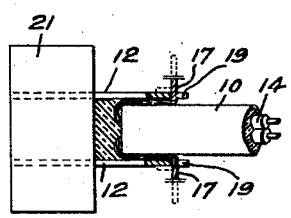
Fig. 6 illustrates one step in the process in which the cord is advanced between the contacts.
Figure 7:
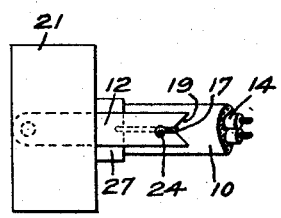
Fig. 7 illustrates a step in the process of manufacture following the step shown in Fig. 6, and showing the manner in which the conductors of the cords are soldered to the metal contact strips.

The next step of the process is to retain the contact members in proper spaced relationship, while they are being electrically connected to the bared conductor portions 17. As shown in Fig. 5 I prefer to retain the contact members 12 in a suitable block 21, which is provided with spaced apertures 22 for this purpose. At this time or at a subsequent period of the process, the block 21 may be suitably secured to a spindle 23, which is capable of being rotated. After a small block 27 of uncured rubber stock has been inserted between the contact members, for a purpose later to be described the end of the electrical cord 10 is inserted by the operator between the projecting ends of the contact members 12, with the bared conductors 17 in spread position and extending thru the V-shaped slots 19. As the cord is advanced toward the block 21, slots 19 serve to keep the bared conductors 17 in alignment with contact members 12, so that when the end of the cord has been inserted to abut block 27 as shown in Fig. 6, the bared conductor portions 17 directly underlie the contact members. The superfluous portions of the conductors 17 may then be cut off as shown in Fig. 6 and for convenience a small portion may be left for bending down upon the outer faces of contact members 12, thus facilitating forming a soldered connection 24.

Figure 8:
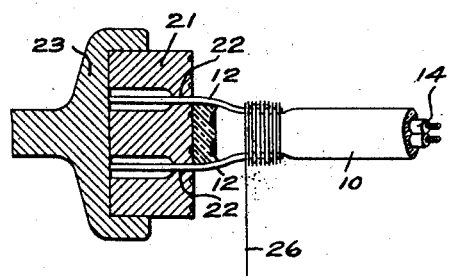
Fig. 8 illustrates the succeeding steps in the process of manufacture, in which the ends of the contact strips are bound and thus anchored to the end of the flexible electric cord.
Figure 9:
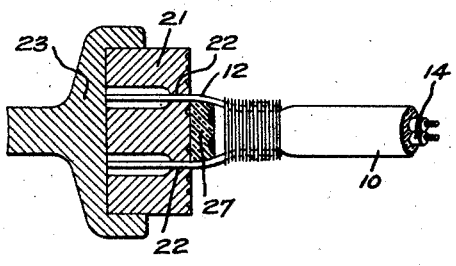
Fig. 9 illustrates the assembly after the binding cord has been applied.

The next step of my process as illustrated in Fig. 8, is to press the projecting ends of the contact members upon the cord and to bind the same to the end portion of the cord. In practice after the contact members are mechanically pressed onto the cord sheath, block 21 is rotated while a cord 26 or tape is tightly wrapped about the contact members and the end of the cord 10, thus tightly clamping the contact members against the rubber sheath 16 of the cord. This binding of the contact members to the electrical cord makes it possible for me to utilize the cord as a core for applying the rubber stock to be subsequently vulcanized to form a plug body, and also causes a superior article to be produced since strain placed upon the contact members is taken up directly by the electrical cord and the connections between wire and contact members relieved therefrom. Furthermore the bending back of the bared conductors underneath the contact members, makes it impossible for relative movements of the contact members to subsequently cause breaking of the conductors or of the electrical connections 24.

The rubber stock for forming the body of the terminal may now be applied to the assembly. In order to form that portion of the body lying directly between the contact members 12, I prefer to insert a small block 27 of rubber stock, between the inner ends of the electrical cord 10 and the adjacent face of the block 21. I have found that without this rubber block it is difficult to properly fill this space by rubber stock applied about the assembly. The block 27 may be inserted at any time before applying the rubber stock for the body, but I preferably position the same between the contact members 12 before the cord is advanced between the contacts, as has previously been mentioned.

Figure 10:
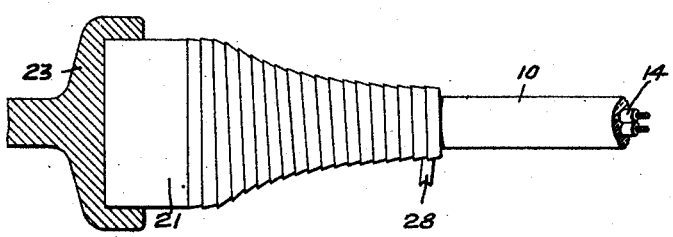
Fig. 10 illustrates a succeeding step of the process, in which uncured rubber ribbon is wound about the assembly to form the body of the terminal.

For forming the body of the terminal I may apply premolded sections of uncured or semi-cured rubber stock about the assembly, but I have found that superior results may be obtained by wrapping a band or ribbon 28 of uncured rubber about the assembly as indicated in Fig. 10. This may be efficiently accomplished by rotation of the spindle 23.

Figure 11:
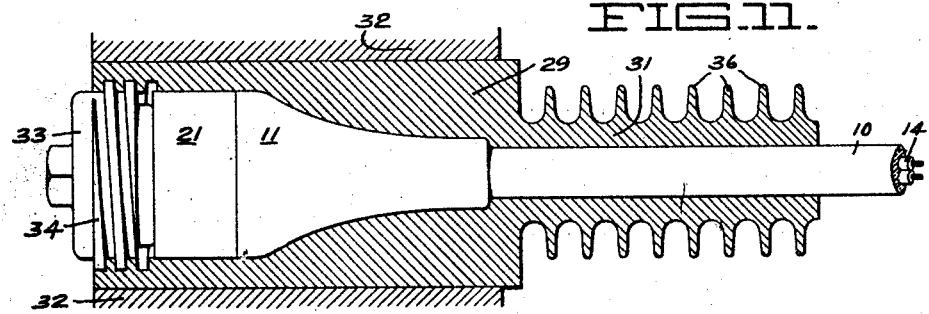
Fig. 11 illustrates a mold for vulcanizing the assembly shown in Fig. 10, and also illustrates the process of vulcanizing the body of the terminal.

The assembly is now ready to be vulcanized or cured. As shown in Fig. 11 the mold which I prefer to employ is preferably tubular, having a portion 29 formed to receive the body 11 of the terminal, and an extended portion 31 which serves to enclose a substantial portion of the electrical cord 10 adjacent to the body of the terminals. In order to supply vulcanizing heat to the mold, I have indicated the heated members 32 as being in thermal contact with the portion 29. It is of course understood that portion 29 may be directly heated either by heated air, steam or by electrical means. Portion 29 is also preferably adapted to receive the block 21, and this block 21 is preferably made cylindrical, or similar to the contour of the terminal, for this purpose. I have found that the rubber forms a more compact body when it is maintained under compression during vulcanizing, and to secure this result I preferably provide a pressure block 33 having threaded engagement 34 with the mold, and by screwing up block 33, block 21 may be forced inwardly upon the body of the terminal to tightly compress the rubber stock.

The body portion 29 of the mold is maintained at a vulcanizing temperature of a sufficient degree and for a time sufficient to produce proper curing of the terminal body and a permanent bond between the body and the cord sheath. As is well known, rubber when subjected to vulcanizing temperature tends to flux and flow and in order to prevent its escaping from the mold through the cord entrance and thereby relieving itself of the compression to which it is subjected, it is necessary to make the cord serve as a stopper of that entrance. Accordingly the mold is provided with a relatively long tubular extension having heat dissipating means designed to receive the sheathed cord end tightly therein and frictionally retain it against ejection during the vulcanizing process. The extended mold portion 31 is preferably provided with fins 36 or some other suitable means for dissipating heat conducted from the body portion 29. Thus from the body portion 29, to that point of the mold where the electrical cord enters the same, there is a substantial temperature gradient, or in other words there is a substantial decrease in temperature. The temperature of the mold at that point where the cord enters the same, is preferably made such a low value as to have no effect upon the adjacent portion of the rubber cord sheath. By utilizing a mold of this sort I can secure a finished product in which the cord is not enlarged or damaged by vulcanizing the terminal body to the same and in which the body has good mechanical bond with the cord sheath. If it is attempted to vulcanize a terminal body in a mold which does not have a low temperature at the point where the flexible cord enters the same, the adjacent unexposed portion of the cord sheath will be affected by the heat of the mold and will become enlarged and permanently damaged. If low temperature vulcanizing is attempted with an ordinary mold to avoid cord enlargement, a good bond between the body and cord sheath cannot be obtained. By utilizing the extended portion 31, I enclose that portion of of the cord sheath which is heated to a sufficient degree to cause enlargement of the same if not enclosed, and at the same time I reduce the temperature at the point where the cord enters the mold so that the adjacent unenclosed cord portion is not damaged. Such a mold therefore permits high temperature vulcanizing of the body.

Figure 12:
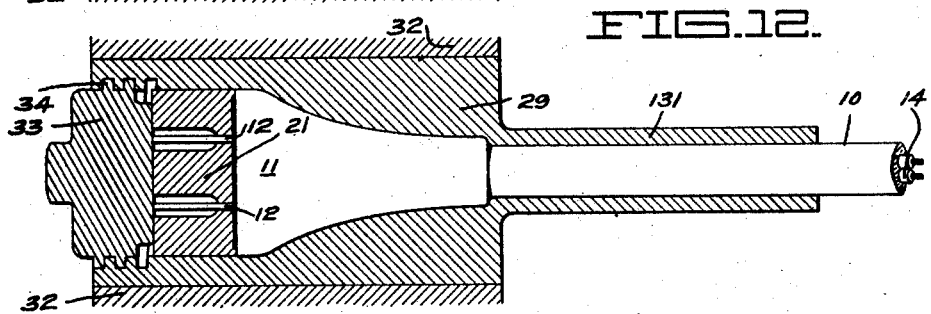
Fig. 12 is a view similar to that of Fig. 11, but illustrates a modified form of vulcanizing mold.

In Fig. 12 I have shown a modified form of mold for securing a relatively low temperature at the point where the cord enters the mold. In this case the extended portion 131 is of relatively small or restricted cross section so that conduction of heat from the body portion 29 of the mold is restricted. By a small amount of radiation and absorption, the temperature of the outer end of extended portion 131 may be maintained at the desired low value.

Figure 13:
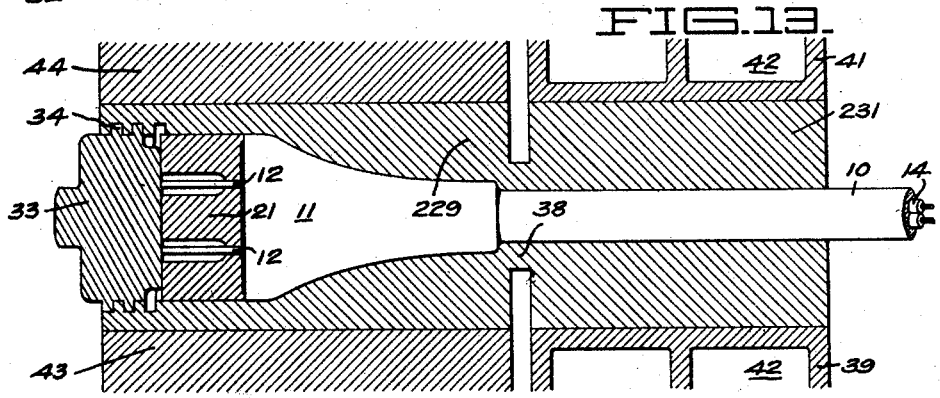
Fig. 13 is a view similar to Fig. 12 but illustrates a further form of vulcanizing mold.
Figure 14:
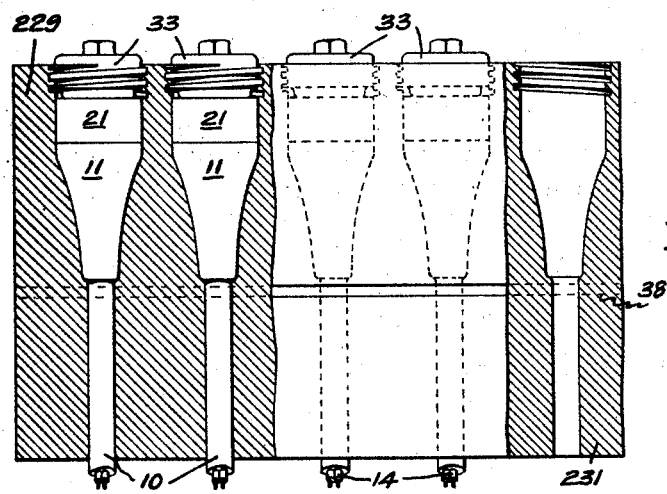
Fig. 14 is a plan view partly in section of the mold illustrated in Fig. 13.

In Figs. 13 and 14 I have illustrated another form of mold suitable for quantity manufacture. In this case the mold is in the form of an elongated block formed to receive a series of terminal assemblies. If desired this block may be formed in two separable sections in order to facilitate insertion and removal of the assemblies. The extended portion 231 of this mold is suitably connected to the heated portion 229 by means of a portion 38 of restricted cross section, so as to limit the amount of heat conducted into portion 231. A vulcanizing heat is applied to portion 229, while portion 231 is preferably retained in thermal contact with members 39 and 41 which serve to absorb heat. For example members 39 and 41 may be formed as relatively movable members of a special machine, and may be cooled by radiating fins or by water flowing thru the pockets 42. Members 43 and 44 for applying heat to the body portions 229, may likewise be incorporated as relatively movable members of the same machine. By properly absorbing heat from the mold portions 231, the same temperature gradient effect can be secured as with the molds shown in Figs. 11 and 12.

After the vulcanizing operation, the terminal is completed and may be removed from the mold. In case the mold is not made in removable sections, in removing the assembly it is necessary to draw the entire length of flexible cord thru the mold. I have found that a resilient terminal constructed in accordance with the process outlined above, and with the apparatus described, possesses excellent electric properties and has high mechanical strength. Because of the manner in which the contact members 12 are connected to the conductors of the cord, and because of the manner in which strains are transmitted to the cord by virtue of anchoring of the contacts directly to the cord, the terminal has a relatively long useful life and is practically indestructible.

I claim:

1. A mold for vulcanizing a rubber body upon one end of a rubber sheathed cord, said mold comprising a portion for receiving said body and adapted to be heated to a vulcanizing temperature, and a relatively long tubular portion adapted to enclose tightly a substantial length of the cord adjacent the body, said latter portion being maintained at a substantially lower temperature whereby the temperature of the mold at the point where the cord projects from the mold is insufficient to effect any physical change in the adjacent unenclosed portion of the cord.

2. The method of producing a resilient rubber cord terminal consisting in mounting a plurality of electrical contacts in a holder and having portions projecting therefrom, inserting uncured rubber between the contacts, inserting an end of a rubber sheathed cable, having bared ends of conductors projecting therefrom, between said contacts, wrapping uncured rubber about said contacts and rubber cable to the approximate form of said finished terminal, and vulcanizing said uncured rubber to form a body integral with the rubber cable sheathing.

3. The method of producing a resilient rubber cord terminal comprising the mounting of a plurality of electrical contacts having slotted base portions in a holder, and so spaced as to be adapted to fit a complementary receptacle, inserting between said contacts a rubber sheathed cable having bared conductors extending from the end thereof, said bared conductors being bent backwardly on the cable sheath by the slots in the contact bases as the cable is inserted between said contacts and making electrical contact therewith, said contact bases being then bent onto said cable and bound in position, and resilient rubber disposed about said contacts and cable and vulcanized to form a body integral with the rubber sheath of said cable.

4. The method of producing a resilient rubber cord terminal, consisting in mounting the metal contacts properly spaced in a holder block, the ends of said contacts to be embedded left exposed, inserting a rubber sheathed cable having exposed conductors between said exposed contact portions, covering the contacts and cable to be embedded with uncured rubber, then placing said contact holding block and unmolded terminal into a mold having a heat dissipating projection into which the adjacent portion of the cable fits, and then heating said mold portion containing the terminal body, while applying longitudinal pressure to the contact holding block while vulcanizing.

5. The method of manufacturing a resilient rubber cord terminal as an integral part of a rubber sheathed flexible cord comprising, the inserting of the rubber sheathed cable, having bared conductors projecting from the end thereof, between the ends of spaced contacts, connecting said contacts electrically to the bared cable conductors, bending said contacts onto said cable, binding said contacts to the cable, covering said contact bases and cord end with uncured rubber and vulcanizing this to form a body integral with said cord rubber sheathing.

In testimony whereof, I have hereunto set my hand.

NOBLE H. WATTS.